(12) United States Patent
Jeanblanc et al.

(10) Patent No.: US 7,127,440 B2
(45) Date of Patent: Oct. 24, 2006

(54) KNOWLEDGE MANAGEMENT SYSTEM AND METHOD

(75) Inventors: Anne H. Jeanblanc, Galva, IL (US);
James M. Coffey, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 714 days.

(21) Appl. No.: 09/995,822

(22) Filed: Nov. 29, 2001

(65) Prior Publication Data

US 2003/0101066 A1 May 29, 2003

(51) Int. Cl.
*G06F 17/00* (2006.01)
*G06N 5/00* (2006.01)

(52) U.S. Cl. .............................. 706/45; 706/11; 706/14

(58) Field of Classification Search ................. 706/45, 706/11, 14; 705/8
See application file for complete search history.

(56) References Cited

U.S. PATENT DOCUMENTS

| | | | |
|---|---|---|---|
| 5,006,998 A | 4/1991 | Yasunobu et al. | |
| 5,557,515 A | 9/1996 | Abbruzzese et al. | |
| 5,706,452 A | 1/1998 | Ivanov | |
| 5,862,223 A | 1/1999 | Walker et al. | |
| 5,875,431 A | 2/1999 | Heckman et al. | |
| 5,890,132 A | 3/1999 | Sanders | |
| 5,924,072 A | 7/1999 | Havens | |
| 5,948,054 A | 9/1999 | Nielsen | |
| 6,026,148 A | 2/2000 | Dworkin et al. | |
| 6,038,537 A | 3/2000 | Matsuoka | |
| 6,038,543 A | 3/2000 | Kurosawa | |
| 6,044,354 A | 3/2000 | Asplen, Jr. | |
| 6,115,709 A | 9/2000 | Gilmour et al. | |
| 6,128,646 A | 10/2000 | Miloslavsky | |
| 6,195,657 B1 | 2/2001 | Rucker et al. | |
| 6,205,472 B1 | 3/2001 | Gilmour | |
| 2002/0073080 A1* | 6/2002 | Lipkin ............................ 707/3 |
| 2002/0073236 A1* | 6/2002 | Hegleson et al. ............ 709/246 |
| 2002/0138590 A1* | 9/2002 | Beams et al. ................ 709/218 |
| 2003/0023686 A1* | 1/2003 | Beams et al. ................ 709/205 |
| 2003/0229529 A1* | 12/2003 | Mui et al. ........................ 705/8 |

* cited by examiner

*Primary Examiner*—Joseph P. Hirl
(74) *Attorney, Agent, or Firm*—Finnegan,Henderson, Farabow,Garrett&Dunner

(57) ABSTRACT

A method is provided for establishing a community of practice including a plurality of users, one or more experts, and one or more community of practice managers. A need for a community of practice is identified. The roles and responsibilities of participants in the community of practice are identified. One or more goals are identified for the community of practice based on the identified need. A plurality of the participants in the community of practice collaborate to achieve the identified goals.

28 Claims, 3 Drawing Sheets

KNOWLEDGE MANAGEMENT SYSTEM AND METHOD

TECHNICAL FIELD

The present invention relates generally to knowledge management, and more particularly, to a method and system for gathering, managing, and sharing knowledge in a community of practice.

BACKGROUND

Organizations, such as businesses, often rely heavily on knowledge within the organization itself. One example of this reliance is training. Experienced employees are often called upon to train new employees. In addition to training the new employee how to do the job, the experienced employee may also share advice based on lessons the experienced employee learned by doing the same job. Another example is a "resident expert." Often an employee, through education or experience or both, has become particularly knowledgeable about a topic. Other employees who need advice or information about this topic may contact the "resident expert." Other examples of important corporate knowledge are internal standards. Internal standards for a procedure or product may be generated and updated by the persons in the organization who are responsible for the procedure or product. The internal standards may be used by the responsible team to ensure that procedures and policies are followed. Further, the internal standards may be used as a guide to quickly train new members of the team. Finally, internal standards may be used by other divisions of the organization as a basis for forming their own standards or for interacting with the responsible team.

Organizational knowledge may be very valuable to an organization. A number of problems exist, however, which may cause the organization to not fully utilize, or even realize the extent of, this organizational knowledge. One problem is that organizational knowledge is often not captured from the knowledgeable employee and documented for use by others. Unless knowledge is documented, it is possible that others within the organization will not be able to determine where particular organizational knowledge resides, and thus the knowledge will be underutilized. Additionally, if a knowledgeable employee leaves the organization without first documenting his knowledge, that knowledge will be lost to the organization. Another problem is that, while an employee may be particularly knowledgeable, until that knowledge has been identified, other persons in the organization (including in other divisions of the organization) may be unaware of the existence of the "resident expert."

Further, many organizations are becoming increasingly globalized. For example, one company may have corporate headquarters located in one state, research and development facilities located in a second state, manufacturing operations in a number of other states, and retail facilities worldwide. Part of the reason for this globalization is the ease with which communications between these locations may occur. While the technology exists to permit interaction and collaboration among persons at different locations in the organization, current systems do not provide sufficient structure to identify sources of knowledge and enable interaction between persons having knowledge and persons seeking knowledge. Not only does the organizational knowledge need to be globally accessible, but interaction must also be supported.

Finally, in addition to merely capturing the knowledge, it is most effective to provide for interaction and collaboration based on the knowledge. Rather than simply requesting persons to submit any knowledge that they might have, even if directed to a particular topic, it is effective to instead focus the interested persons on a project, goal, or purpose. From the interaction and collaboration that follows based on the project, the knowledge can be captured and documented.

In addition to systems that permit limited interaction, systems also exist that permit some documentation of organizational knowledge. Some of these systems may include mere cataloging of information or mere answering of questions. These systems, however, are limited to a single facet of knowledge, such as "best practices" or internal standards. The systems may also be limited in the persons that may participate. Additionally, these systems are often relatively static and non-interactive. For example, some of these systems may be simply a list of frequently asked questions. At best, some systems refer a user to the person who supplied the knowledge that the user is accessing. The currently available systems do not provide sufficient interaction and/or collaboration with other users to achieve a common purpose based on the knowledge, nor do the current systems provide a dynamic, constantly updating knowledge system. One exemplary existing system is described in U.S. Pat. No. 5,924,072, entitled "Knowledge Management System and Method." This system provides for the submission of knowledge items by a user, as well as the use of the knowledge items by a second user. The second user may submit feedback about the knowledge item. However, there is no interaction or collaboration between the users; further, the system is designed merely to acquire knowledge.

The present invention is directed to overcoming one or more of the problems or disadvantages associated with the prior art.

SUMMARY OF THE INVENTION

A method is provided for establishing a community of practice including as participants a plurality of users, one or more experts, and one or more community of practice managers. A need for a community of practice is identified. The roles and responsibilities of participants in the community of practice are identified. One or more goals are identified for the community of practice based on the identified need. A plurality of the participants in the community of practice collaborate to achieve the identified goals.

Further, a method for managing a knowledge management architecture for use in a community of practice is provided. Knowledge is captured from community of practice participants. The knowledge is then approved. Approved knowledge is delivered to community of practice participants. Knowledge is then maintained in a knowledge database. The community of practice participants include a plurality of users, one or more community practice managers, and one or more experts associated with the community of practice.

Additionally, a system for managing knowledge is provided. The system includes a community of practice. The community of practice includes a knowledge management architecture, a plurality of users, one or more experts, and one or more community of practice managers, all interconnected by a network. The knowledge management architecture includes a web server module, a security module, an e-mail server, a knowledge database, and a document management system.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

A system and method are provided to capture, manage, and share knowledge within an organization. The system and method of the present invention are not limited to knowledge management within an organization, but may be used to facilitate the capture, management, and sharing of knowledge within any organized group of persons working for common goals or purposes. Specifically, a community of practice is formed to facilitate the capturing, managing, and sharing of knowledge. A community of practice is a group of persons (most typically in a single organization) grouped together for a common purpose or to achieve a common goal. For example, a community of practice may be formed to develop a training program for employees in a division, or to create a set of standards for a new product line. A community of practice is not necessarily based on formal divisions within the organization, but may include members from many divisions who are involved in an aspect of the organization or a particular project. Also included in the community of practice is a set of procedures, best practices and standards that the community of practice can use in working towards the purpose or goal. After the goal or purpose is accomplished, the community of practice can continue as an organizational resource.

Figure 1:
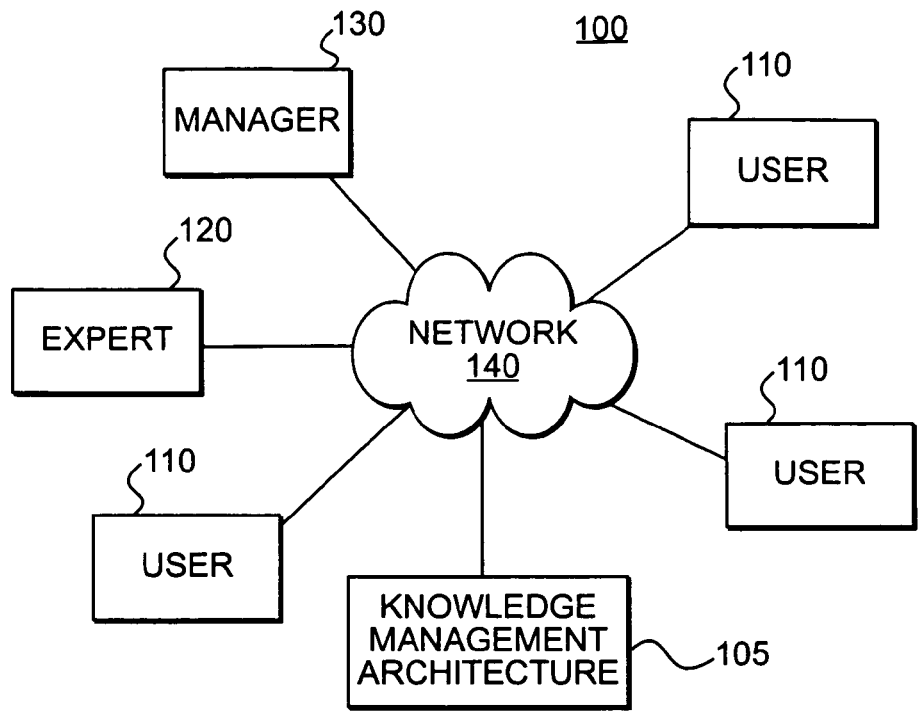
FIG. 1 is a block diagram of an exemplary community of practice consistent with one embodiment of the present invention.

FIG. 1 illustrates an exemplary community of practice 100, consistent with one embodiment of the present invention. As shown in FIG. 1, community of practice 100 includes a knowledge management architecture 105, a plurality of users 110, an expert 120, and a community of practice manager 130, all interconnected by network 140. Knowledge management architecture 105 facilitates interaction among the participants (namely, users 110, expert 120, and manager 130) in community of practice 100. Knowledge management architecture 105 also maintains knowledge entries. Users 110 interact with other users 110, expert 120, and community of practice manager 130 via network 140, for example, by posing questions or responding to the questions of others. Users 110 may also access knowledge entries via knowledge management architecture 105. Further, users 110 may submit their own knowledge to be added to knowledge management architecture 105. Users 110 may interface with community of practice 100 using personal computers, work stations, or other devices connected to network 140.

Expert 120 is similar to user 110, but has been identified within community of practice 100 as having special knowledge. Users 110 may obtain the status of expert 120 through, inter alia, significant participation in a community of practice. In addition to interacting with other entities in community of practice 100 and submitting and accessing knowledge, expert 120 may participate in approving knowledge submitted by users 110. Although only one expert 120 is illustrated in FIG. 1, community of practice 100 may include a plurality of experts.

Community of practice manager 130 functions as the facilitator and moderator for community of practice 100. Community of practice manager 130 may be responsible for review, validation, and dissemination of knowledge in the community of practice. Community of practice 100 may include one or more community of practice managers.

Network 140 may be the Internet, a wireless local area network (LAN), or another type of network. Network 140 is intended in its broadest sense to encompass any communications system.

Figure 2:
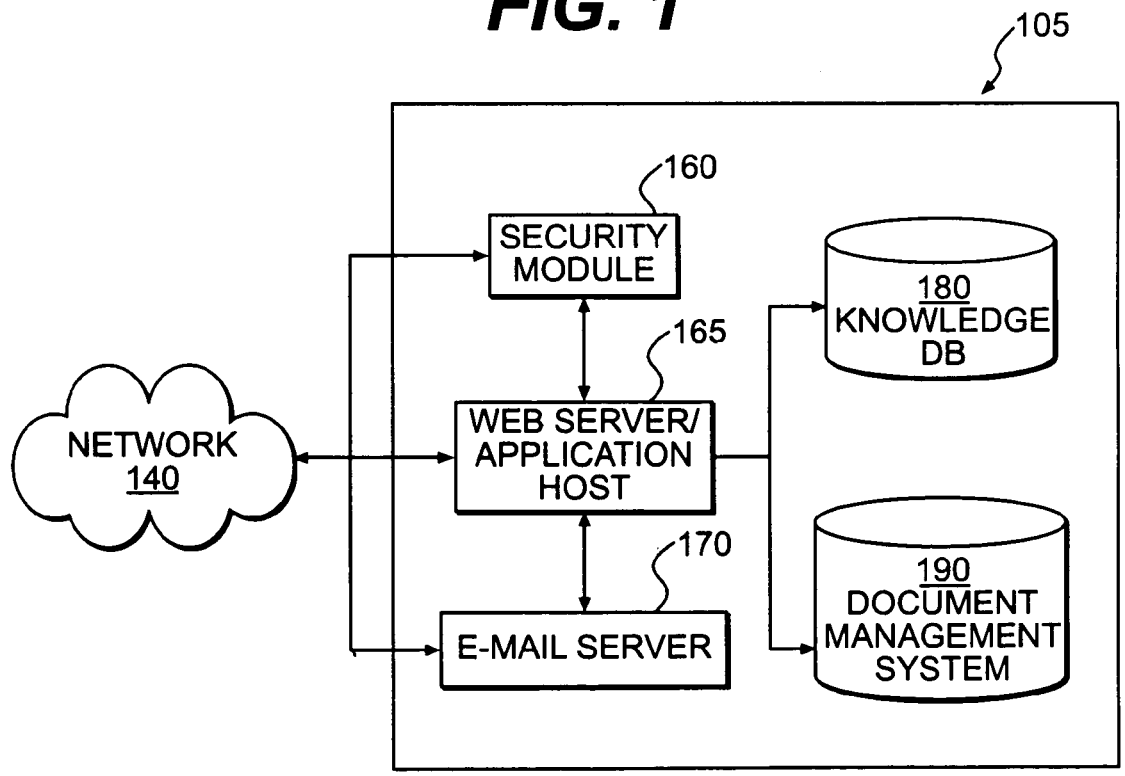
FIG. 2 is a block diagram of an exemplary knowledge management architecture consistent with one embodiment of the present invention.

FIG. 2 is a block diagram illustrating an exemplary knowledge management architecture 105. Knowledge management architecture 105 may include a security module 160, a Web server/application host module 165, an e-mail server 170, a knowledge database 180, and a document management system 190. Security module 160, Web server module 165, and e-mail server 170 interface with network 140. Web server module 165 is connected to e-mail server 170. Web server module 165 is also connected to knowledge database 180 and document management system 190. It is contemplated that a knowledge management system of the present invention may include some or all of the components of FIG. 2.

Security module 160 may determine what type of access each entity in community of practice 100 has with respect to knowledge database 180 and/or the document management system 190. For example, users 110 may access knowledge in knowledge database 180 but may not alter the knowledge. Further, users 110 who wish to add knowledge to knowledge database 180 may require approval of the knowledge before the knowledge is added. Expert 120 and/or community of practice manager 130, on the other hand, may be permitted access to knowledge database 180, as well as the ability to alter knowledge database 180. Further, security module 160 may be used to permit different levels of access to different users, based on, for example, subscription status. For example, anonymous users 110 may be permitted access to only a portion of knowledge database 180, whereas registered users 110 may access the entire knowledge database. While security is important, access is important to achieve interaction and collaboration, and security should be minimized if possible.

Web server/application host module 165 includes an interface for entities to access knowledge database 180, as well as document management system 190. Further, web server module 165 may include additional capabilities, such as collaboration tools to permit entities in community of practice 100 to work together, bulletin boards to permit entities in community of practice 100 to communicate with each other, and/or search engines to provide efficient access to specific knowledge entries in knowledge database 180 or document management system 190. Web server module 165 may also permit entities in community of practice 100 to submit knowledge to be added to knowledge base 180. An exemplary web server application is ColdFusion® by Allaire.

E-mail server 170 provides users 110, expert 120, and community of practice manager 130 with updated information from knowledge management architecture 105. For example, when a new knowledge entry has been approved, e-mail server 170 may forward the knowledge entry to the other entities in the community of practice 100. Alternatively, e-mail server 170 may forward notice of the availability of a new knowledge entry, tool, or standard that may be accessed using Web server module 165.

Knowledge database 180 contains approved knowledge entries, standards, tools, and other information used by entities in community of practice 100. Knowledge management architecture 105 may include one or more knowledge databases 180.

Document management system 190 provides access to documents stored in a number of different formats, such as word processing format, spread sheet format, or presentation format. Document management system 190 permits more rapid capture of knowledge, because documents do not need to be converted before they can be shared with the community of practice.

Figure 3:
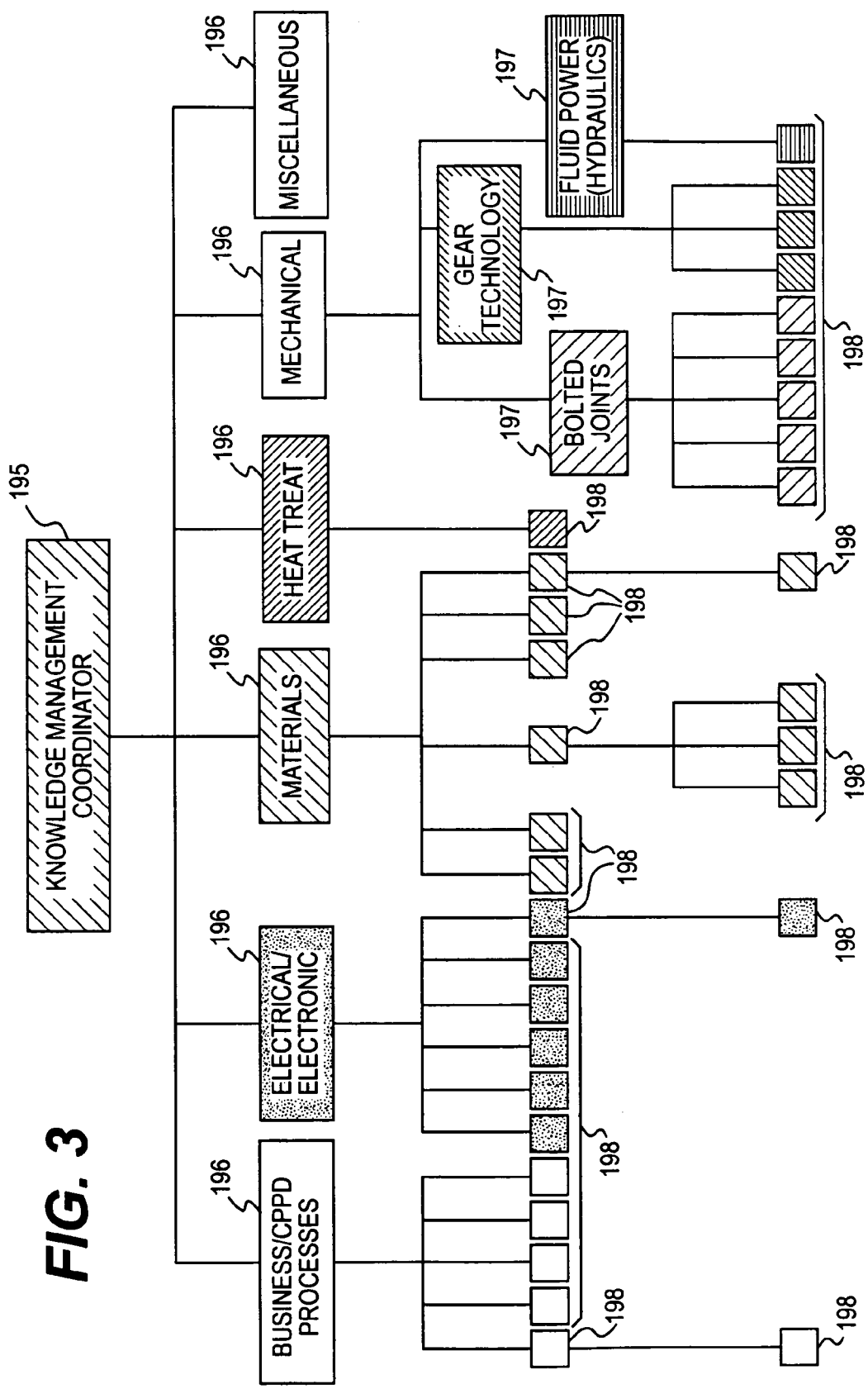
FIG. 3 is a block diagram of an exemplary knowledge management system consistent with one embodiment of the present invention.

FIG. 3 illustrates an exemplary knowledge management system for an organization, consistent with one embodiment of the present invention. For example, the knowledge management system may include a knowledge management coordinator 195, one or more community groups 196, and one or more communities of practice 198. The one or more community groups may also include one or more sub-community groups 197. Knowledge management coordinator 195 oversees community groups 196 and communities of practice 198. Community groups 196 are logical divisions that may facilitate operation of communities of practice 198 by grouping communities of practice 198 with similar interests or goals. In the exemplary knowledge management system of FIG. 3, the community groups 196 include "Business/CPPD Processes," "Electrical/Electronic," "Materials," "Heat Treat," "Mechanical," and "Miscellaneous." As illustrated in FIG. 3, the "Mechanical" community group may include sub-community groups 197, which include more specific subject areas.

Figure 4:
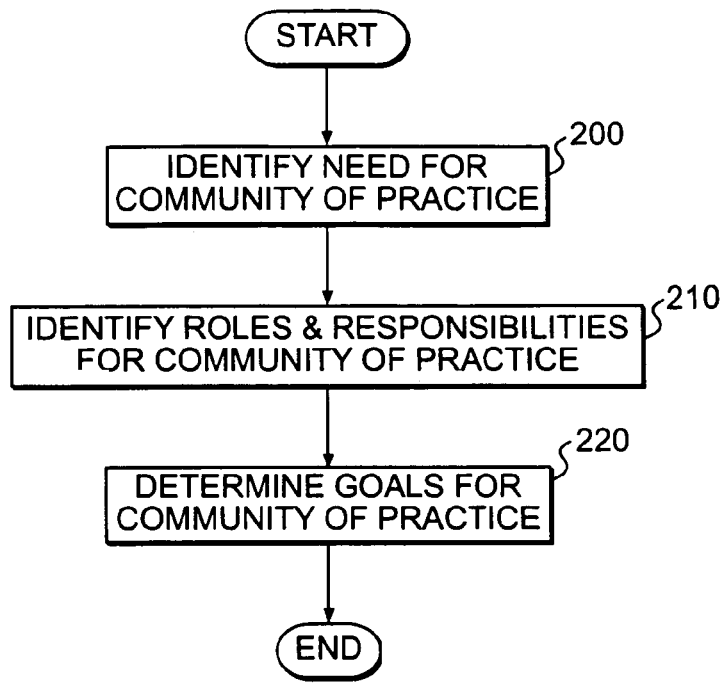
FIG. 4 is an exemplary flow chart illustrating a method for creating a community of practice, consistent with one embodiment of the present invention.

FIG. 4 illustrates an exemplary flow chart of a method for establishing a community of practice. First, a need for a community of practice is identified, for example, by identifying knowledge building activities (step 200). Knowledge building activities may include any activity where problems may be identified, solutions may be generated, or any other body of knowledge may be gathered or created. For example, knowledge building activities may include problem-solving activities, team meetings, firm-wide retreats, or new product designs or launches. A knowledge management coordinator, who may oversee the operation of a number of communities of practice for the organization, may be notified of the new community of practice and may assist with the formation of the new community of practice.

Next, the roles and responsibilities of the community of practice are identified (step 210). One or more community of practice managers may be identified to organize the community of practice and to facilitate and moderate interaction among participants. One or more experts may be associated with the community of practice. In addition, relevant documentation may be identified and collected. For example, existing design guides, training materials, tools, standards, and regulations may be added to the knowledge database (or alternatively, be made available through the document management system). Depending on the roles of various participants in the community of practice, security levels and requirements may also be established. Responsibilities of an expert may include approving knowledge entries submitted by users or periodically answering questions posted via the community of practice. Responsibilities of a manager may include approving knowledge entries submitted by users, organizing interaction between participants in the community of practice, and encouraging participants to work towards the achievement of the goals of the community of practice. It may also be determined to what extent users may participate, and whether different users may have different access to knowledge database. Participants in the community of practice may, if appropriate, receive training in order to enhance their usage of the community of practice.

Goals for the community of practice are then determined (step 220). The goals of the community of practice may include the goals or purposes for which the community of practice was formed. For example, goals may be product-oriented, such as creating a design guide for a new product or developing a software product for testing a new product. Goals may also be information-oriented, such as distributing information from recent symposia or meetings or collecting feedback from organizational locations worldwide to determine required improvements. Further, goals may be career-oriented, such as developing training programs for new employees and providing networking between persons in the organization. Another method for determining goals for the community of practice includes determining what knowledge is missing or what knowledge should be updated. The goal of a community of practice, as encompassed by the present invention, is not the mere cataloging of information within an organization nor the mere answering of questions.

Figure 5:
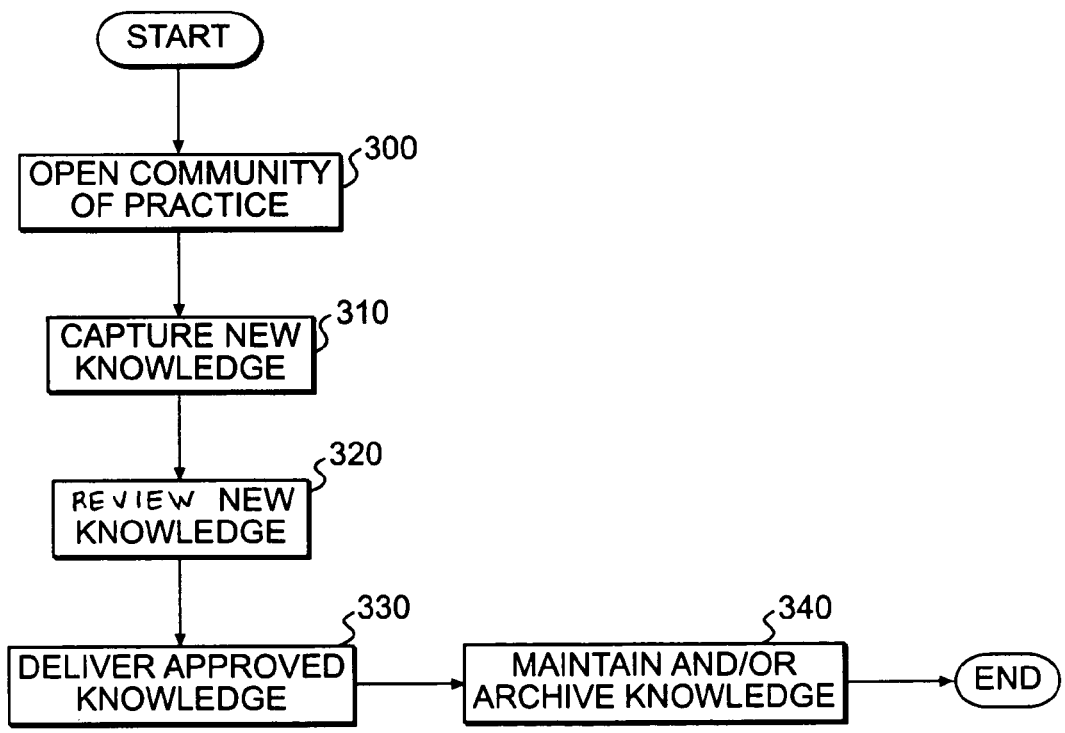
FIG. 5 is an exemplary flow chart illustrating a method for managing knowledge, consistent with one embodiment of the present invention.

FIG. 5 is an exemplary flowchart illustrating a method for capturing, managing, and sharing knowledge in an established community of practice. Once a community of practice is established, the community of practice is opened (step 300). The community of practice may be advertised within the organization, for example, via company newsletters, e-mails, or other media. Persons wishing to join a community of practice may be asked to enroll or subscribe in the community of practice. There may be different levels of membership, each having a level of security associated. Alternatively, all users may have access to all parts of the knowledge database associated with the community of practice.

The community of practice then may capture new knowledge (step 310). New knowledge may be submitted by users, or may be gathered from interactions (for example, via electronic bulletin board or other collaborative tool) between users via knowledge management architecture 105. Knowledge may include explanations of a situation, commentary on a situation, suggestions for improving a situation, links or references to supporting material, or suggestions of persons who may have additional knowledge. Knowledge may also include information about the person supplying the knowledge. Knowledge may be left in its original format, including word processing, spread sheet, or presentation format. Knowledge that is not in electronic format may be scanned to create an electronic document that may then be attached to electronic mail or messages. By leaving knowledge in the original format, the substance can be reviewed and fine-tuned prior to any conversion.

Next, the captured knowledge is reviewed (step 320). The knowledge may be reviewed to determine if the material is accurate, complete, and/or validated. The knowledge entry may be reviewed by the community of practice manager and/or the expert. Alternatively, the knowledge entry may be reviewed by a review team consisting of a number of persons and resources from within the organization or community of practice.

Once the knowledge entry has been approved, it is delivered (step 330). Delivery of knowledge may include e-mailing the entry to all users who have subscribed to the community of practice. Alternatively, the knowledge entry may be made available for browsing via a Web site associated with the community of practice. Delivered knowledge may also include information about validation and future plans. Further delivered knowledge may include the capability to comment on the knowledge, as well as links to obtain more information or related knowledge. The delivered knowledge may have the capability to be forwarded to non-community of practice members.

Finally, knowledge entries are maintained and/or archived (step 340). Specifically, knowledge entries, such as standards, design guides, training materials, or other procedural information may be validated and updated based on the new knowledge entries. Maintenance of these knowledge entries may include version tracking or other organizational procedures to ensure that the current documents and procedures are being followed. Knowledge entries may also be archived for later use.

The community of practice may also be monitored based on standard metrics, such as usage (such as number of times the knowledge database is accessed), time to market, or other criteria. Once it has been determined that the goals or purposes of the community of practice have been achieved, the community of practice can function as an effective resource for the organization.

INDUSTRIAL APPLICABILITY

Knowledge management using the community of practice system and method of the current invention provide a way to permit interaction and collaboration between persons who have knowledge and persons who are seeking knowledge. The present invention supports internal collaboration among team members in an open environment that encourages participation. Further, the present invention provides for documentation of the knowledge, so that the knowledge is available globally and can be easily identified by those who are seeking it. Other benefits of the present invention include the ability to maintain up-to-date standards and best practices, the ability to quickly train new employees, and the ability to collaborate on an organization-wide level. Up-to-date standards and practices can be kept in a central electronic location, accessible by anyone in the organization, and when updates are required, suggestions can be solicited through the community of practice. New employees can be quickly trained, as all of the tools, standards, best practices, and training material are also available in one location. New employees also have the ability to interact with other employees to answer any questions that might arise. Collaboration on an organization-wide level is possible because e-mails containing new knowledge may be routed immediately to all members of the community of practice, while all tools and other materials are available in one location.

The present invention has clear benefits in helping divisions within an organization share information. For example, one division of a company may have identified a problem, but due to time or budget constraints, was unable to create a software program to analyze the problem. A second division of the company had created a spread sheet tool to analyze the problem; however, the tool was stored locally within the second division and was not accessible to the rest of the company, including the division that had identified the problem. In accordance with an embodiment of the present invention, a user in the second division may have submitted the tool to the community of practice where it was reviewed by experts and approved for use throughout the company. Since putting the tool into use, the tool may have been modified by various users in the community of practice based on their experiences. Thus, the division experiencing the problem would have this valuable corporate resource to draw upon.

As another example of the effective use of the present invention, a user in one division of an organization may post a question to an electronic bulletin board associated with the community of practice. In reply, the user may receive responses from persons throughout the organization. Some of the responses may provide answers or suggestions to the user's question; other responses may direct the user to a person knowledgeable about the topic or may direct the user to documentation existing in the knowledge database.

The community of practice system and method of the present invention has virtually unlimited potential uses. A community of practice may be established whenever there is a business requirement. In certain organizations, this may require notifying and obtaining support from a corporate coordinator. Once necessary approvals are obtained, a community of practice manager, associated experts, and any procedures, specifications, training, and standards that the community of practice would be responsible for are identified. Security levels and requirements would be determined for the community, as well as specific goals for the community to accomplish. Training may be provided as necessary for the community. The community of practice would then be opened in the organizational knowledge management system. Once the new community of practice is advertised, membership and subscriptions of users would be accepted. The progress of the community of practice can be measured with standard metrics. Once the original goals are achieved, the community of practice will continue to be an effective corporate resource.

Other aspects and features of the present invention can be obtained from a study of the drawings, the disclosure, and the appended claims.

What is claimed is:

1. A method of establishing a community of practice, the method comprising:
   identifying a need for a community of practice including as participants a plurality of users, one or more experts with special knowledge related to the identified need, and one or more community of practice managers;
   identifying roles and responsibilities for participants in the community of practice including one or more experts approving data submitted by the participants in the community of practice, and one or more community of practice managers organizing interaction among the participants in the community of practice using a knowledge management system accessible by the participants of community of practice;
   identifying one or more goals for the community of practice, based on the identified need;

establishing the community of practice to achieve the one or more goals;

receiving, in a database associated with the knowledge management system, data from one or more participants of the community of practice, the received data related to the community of practice;

maintaining the received data in the database based on the identified roles and responsibilities and the one or more goals; and sharing, by a plurality of the participants of the community of practice, selected data in the database to achieve the one or more goals.

2. The method of claim 1, wherein the step of identifying roles and responsibilities includes:

identifying one or more community of practice managers;

identifying one or more experts associated with the community of practice; and collecting documents to be available to the community of practice.

3. The method of claim 2, wherein the identified community of practice managers are not the same participants as the identified experts.

4. The method of claim 2, further including:

determining a first security level for the plurality of users;

determining a second security level for the one or more experts; and determining a third security level for the one or more community of practice managers.

5. The method of claim 4, wherein the first security level, the second security level, and the third security level establish different levels of access to information stored in the knowledge management system.

6. The method of claim 1, further including:

providing training for users in the community of practice.

7. The method of claim 1, further including:

monitoring progress of the community of practice in achieving the identified one or more goals.

8. A method of managing a knowledge management architecture for use in a community of practice, the method comprising:

capturing, in a knowledge management system, knowledge received from community of practice participants based on a knowledge document received over a computer network, wherein the community of practice participants include a plurality of users, one or more experts having special knowledge related to at least one goal associated with the community of practice, and one or more community of practice managers who organize interaction among participants in the community of practice using the knowledge management system accessible by the participants of the community of practice;

approving, by the one or more experts, the captured knowledge using the knowledge management system;

delivering the approved knowledge to community of practice participants over the computer network;

maintaining the knowledge in a knowledge database included in the knowledge management system; and sharing, by a plurality of the participants of the community of practice, at least some of the knowledge in the database to achieve the at least one goal of the community of practice.

9. The method of claim 8, further including:

opening the community of practice.

10. The method of claim 9, wherein the step of opening the community of practice includes:

advertising the community of practice within an organization; and accepting subscriptions for membership in the community of practice.

11. The method of claim 8, wherein the step of capturing knowledge includes:

receiving the knowledge document from one of the plurality of users; and storing the knowledge document in the knowledge management system, wherein the knowledge document is received in one of a predetermined set of formats.

12. The method of claim 11, wherein the step of receiving the knowledge document includes:

receiving, via electronic mail, the knowledge document.

13. The method of claim 12, wherein the knowledge document includes a word processing document, a presentation document, a spread sheet document, an electronic mail document, or a link to a Web site.

14. The method of claim 8, wherein the step of approving the captured knowledge includes:

identifying a review team including one or more members;

reviewing, via the knowledge management system, the captured knowledge by the identified review team; and receiving an indication, from one or more members of the review team, in the knowledge management system reflecting approval of the captured knowledge.

15. The method of claim 14, wherein the one or more members of the review team includes one or more community of practice managers and one or more experts.

16. The method of claim 8, further including:

receiving, in the knowledge management system, information reflecting feedback associated with the delivered knowledge from one or more participants in the community of practice.

17. The method of claim 16, further including:

revising the knowledge in the knowledge database based on the feedback.

18. A system for managing knowledge in an organization, the system comprising:

a knowledge management architecture configured to provide a mechanism for collaborative interactions among participants of a community of practice to achieve one or more goals of the community of practice, the participants including:

a plurality of users, one or more experts approving data submitted by participants in the community of practice, and one or more community of practice managers who manage interaction among the participants in accordance with the one or more goals of the community of practice, wherein the a network interconnects the knowledge management architecture, the plurality of users, the one or more experts, and the one or more community of practice managers, and the knowledge management architecture includes:

a web server module, connected to the network, for providing tools for use by participants in the community of practice, a security module, connected to the web server module, for ensuring security requirements are met, an e-mail server, connected to the web server module and the network, for delivering knowledge to participants in the community of practice, a knowledge database, connected to the web server module, for storing knowledge entries, and a document management system, connected to the web server module, for permitting access to documents, wherein the participants use the knowledge management architecture to exchange information to achieve the one or more goals of the community of practice.

19. The system of claim 18, wherein the web server module includes collaboration tools that enable the participants to exchange information.

20. The system of claim 18, wherein the web server module includes an electronic bulletin board system that enable the participants to provide information to achieve the goal.

21. The system of claim 18, wherein a plurality of community groups are established within the organization and a plurality of communities of practice are associated with each such community group.

22. A method of managing a community of practice in a knowledge management system, the method comprising:

identifying a goal for the community of practice;

establishing the community of practice to achieve the goal associated with the community of practice;

providing information in a computer system associated with the community of practice established based on:

an identified need for the community of practice, an approval from a coordinator responsible for establishing the community of practice, an identified practice manager and one or more experts with special knowledge related to the identified goal associated with the community of practice, identified one or more documents including data associated with the community of practice, and an identified security level for the community of practice; and managing, by the computer system, the community of practice by allowing participants in the community of practice to exchange information to achieve the goal associated with the community of practice.

23. The method of claim 22, further including:

training users to participate in the community of practice.

24. The method of claim 22, further including:

advertising the community of practice; and receiving, by the computer system, input from a user reflecting a request for membership in the community of practice.

25. The method of claim 22, wherein managing the community of practice includes:

monitoring information associated with at least one of a number of users that request membership into the community of practice, a number of participants in the community of practice, a number of times a database in the computer system is accessed, wherein the database stores knowledge associated with the community of practice, and an amount of time to achieve the goal.

26. A system for managing a community of practice, including:

a knowledge management system; and a network interconnecting the knowledge management system to participants of a community of practice, the participants including at least an expert approving data submitted by participants in the community of practice and a manager organizing interaction among the participants in the community of practice, wherein the knowledge management system provides information reflecting the existence of the community of practice over the network and receives one or more requests for membership into the community of practice from one or more users and the knowledge management system provides information reflecting the acceptance of the one or more requests for membership into the community of practice.

27. A system for managing a community of practice, including:

a knowledge management system including a database; and a network interconnecting the knowledge management system to participants of a community of practice, the participants including at least an expert approving data submitted by participants in the community of practice, a user, and a manager organizing interaction among the participants, wherein the knowledge management system receives knowledge from the user over the network, receives approval of knowledge submitted by the user in the community of practice from the expert, and provides the knowledge to each of the participants via the network for achieving a goal of the community of practice.

28. The system of claim 27, wherein the knowledge management system provides the knowledge by at least one of sending data reflecting the knowledge to each of the participants over the network, and storing the knowledge in the database that is accessible to each of the participants over the network.

* * * * *